United States Patent
Shindoh

(10) Patent No.: US 10,275,846 B2
(45) Date of Patent: Apr. 30, 2019

(54) INFORMATION PROCESSING APPARATUS, INFORMATION PROCESSING METHOD, AND RECORDING MEDIUM

(71) Applicant: Hidenori Shindoh, Tokyo (JP)

(72) Inventor: Hidenori Shindoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 50 days.

(21) Appl. No.: 15/591,821

(22) Filed: May 10, 2017

(65) Prior Publication Data

US 2017/0345117 A1 Nov. 30, 2017

(30) Foreign Application Priority Data

May 25, 2016 (JP) .................................. 2016-103843

(51) Int. Cl.
*G06K 9/00* (2006.01)
*G06T 1/00* (2006.01)
*G06T 5/20* (2006.01)

(52) U.S. Cl.
CPC .......... *G06T 1/0021* (2013.01); *G06T 1/0028* (2013.01); *G06T 5/20* (2013.01); *G06T 2201/0051* (2013.01); *G06T 2201/0052* (2013.01)

(58) Field of Classification Search
CPC ....... G06T 1/0021–1/0092; G06T 5/20; G06T 2201/005–2201/0601; H04N 1/32144; H04N 1/3232; H04N 1/32331–1/32347; H04N 2005/91335; H04N 19/467; H04N 21/23892; H04N 21/8358; H04N 2201/3233; G06F 3/1243; G06F 21/16; G06F 2221/0733
See application file for complete search history.

(56) References Cited

U.S. PATENT DOCUMENTS

| 5,734,752 A | * | 3/1998 | Knox | G06T 1/0028 235/494 |
| 7,406,712 B2 | * | 7/2008 | Kondo | G06F 3/0481 726/2 |
| 2003/0210803 A1 | * | 11/2003 | Kaneda | G06T 1/0028 382/100 |
| 2006/0236112 A1 | * | 10/2006 | Maeno | H04N 1/32144 713/176 |

(Continued)

FOREIGN PATENT DOCUMENTS

| JP | 2007-104471 | 4/2007 |
| JP | 2009-201069 | 9/2009 |

(Continued)

OTHER PUBLICATIONS

U.S. Appl. No. 15/459,471, filed Mar. 15, 2017.
U.S. Appl. No. 15/467,063, filed Mar. 23, 2017.

*Primary Examiner* — Jose L Couso
(74) *Attorney, Agent, or Firm* — Oblon, McClelland, Maier & Neustadt, L.L.P.

(57) ABSTRACT

An information processing apparatus includes circuitry that determines whether or not an image described based on image data is continuous with an area where watermark information is to be embedded to generate a determination result and changes, in accordance with the determination result, the area where the watermark information is to be embedded.

8 Claims, 15 Drawing Sheets

(56) References Cited

U.S. PATENT DOCUMENTS

| | | | |
|---|---|---|---|
| 2010/0067736 A1* | 3/2010 | Kihara | G06T 1/0028 382/100 |
| 2010/0123923 A1 | 5/2010 | Katoh et al. | |
| 2010/0157377 A1* | 6/2010 | Zhao | B41M 3/144 358/3.28 |
| 2010/0245928 A1* | 9/2010 | Zhao | H04N 1/32229 358/3.28 |
| 2011/0212717 A1* | 9/2011 | Rhoads | G06F 17/30241 455/420 |
| 2012/0147440 A1 | 6/2012 | Shindo et al. | |
| 2013/0003116 A1 | 1/2013 | Katoh et al. | |
| 2015/0356761 A1 | 12/2015 | Saitoh et al. | |
| 2017/0041486 A1 | 2/2017 | Noda et al. | |

FOREIGN PATENT DOCUMENTS

| | | |
|---|---|---|
| JP | 2009-253854 | 10/2009 |
| JP | 2010-074387 | 4/2010 |

* cited by examiner

FIG. 9

| | | | | | | | | | | | | |
|---|---|---|---|---|---|---|---|---|---|---|---|---|
| 0 | 1 | 2 | 3 | 3 | 3 | 3 | 3 | 3 | 2 | 1 | 0 | 0 |
| 0 | 2 | -5 | -3 | -3 | -3 | -3 | -3 | -3 | -5 | 2 | 0 | 0 |
| 0 | 2 | -5 | -3 | -3 | -3 | -3 | -2 | -1 | -3 | 3 | 0 | 0 |
| 0 | 1 | 2 | 3 | 3 | 3 | 4 | 6 | -2 | -4 | 2 | 0 | 0 |
| 0 | 0 | 0 | 0 | 0 | 1 | 3 | -4 | -4 | 3 | 1 | 0 | 0 |
| 0 | 0 | 0 | 0 | 1 | 3 | -4 | -4 | 3 | 1 | 0 | 0 | 0 |
| 0 | 0 | 0 | 1 | 3 | -4 | -4 | 3 | 1 | 0 | 0 | 0 | 0 |
| 0 | 0 | 0 | 2 | -4 | -3 | 4 | 1 | 0 | 0 | 0 | 0 | 0 |
| 0 | 0 | 0 | 3 | -3 | -3 | 3 | 0 | 0 | 0 | 0 | 0 | 0 |
| 0 | 0 | 0 | 3 | -3 | -3 | 3 | 0 | 0 | 0 | 0 | 0 | 0 |
| 0 | 0 | 0 | 3 | -3 | -3 | 3 | 0 | 0 | 0 | 0 | 0 | 0 |
| 0 | 0 | 0 | 3 | -3 | -3 | 3 | 0 | 0 | 0 | 0 | 0 | 0 |
| 1 | 2 | 3 | 5 | -2 | -2 | 5 | 3 | 3 | 3 | 3 | 2 | 1 |
| 2 | -5 | -3 | -2 | -1 | -1 | -2 | -3 | -3 | -3 | -3 | -5 | 2 |

FIG. 12
| 0 | 0 | 0 | 0 | 0 | 0 |—96
|---|---|---|---|---|---|
| 1 | 1 | 1 | 0 | 0 | 1 |—93
| 1 | 1 | 0 | 0 | 1 | 1 |—94
| 1 | 0 | 0 | 1 | 1 | 0 |—95
| 0 | 0 | 1 | 1 | 0 | 0 |
| 0 | 1 | 1 | 0 | 0 | 0 |
92, 91
FIG. 13A
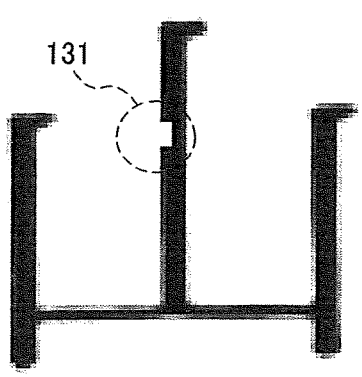
FIG. 13B
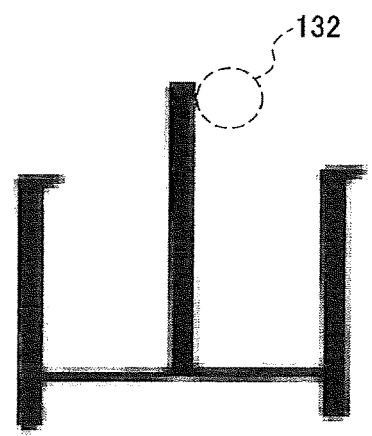

FIG. 20

|   |   |   |   |   |   |
|---|---|---|---|---|---|
| 0 | 0 | 0 | 0 | 0 | 1 |
| 1 | 1 | 1 | 0 | 0 | 1 |
| 1 | 1 | 0 | 0 | 1 | 1 |
| 1 | 0 | 0 | 1 | 1 | 0 |
| 0 | 0 | 1 | 1 | 0 | 0 |
| 0 | 1 | 1 | 0 | 0 | 0 |

186B
181

INFORMATION PROCESSING APPARATUS, INFORMATION PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2016-103843, filed on May 25, 2016 in the Japan Patent Office, the entire disclosure of which is hereby incorporated by reference herein.

BACKGROUND

Technical Field

The present invention relates to an information processing apparatus, an information processing method, and a non-transitory recording medium storing an information processing program.

Background Art

A technology of an electronic watermark that embeds information in image data is known. A known example method of embedding information in image data is a method that embeds watermark information in perpendicular space (frequency space) different from image space. Another example method of embedding information in image data is a method that uses a watermark pattern indicating an amount of modifying a pixel value provided to an original image by performing an operation of embedding electronic watermark embedding watermark information in the original image is also known.

SUMMARY

Example embodiments of the present invention provide a novel information processing apparatus that includes circuitry that determines whether or not an image described based on image data is continuous with an area where watermark information is to be embedded to generate a determination result and changes, in accordance with the determination result, the area where the watermark information is to be embedded.

Further example embodiments of the present invention provide a method of processing information and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 9 is a diagram illustrating an area determined by an area determination unit as an embodiment of the present invention;

FIG. 12 is a diagram illustrating an operation of modifying a position to be embedded as an embodiment of the present invention;

FIGS. 13A and 13B are diagrams illustrating an effect as an embodiment of the present invention;

FIG. 20 is a diagram illustrating an operation of modifying a position to be embedded as an embodiment of the present invention.

Figure 1:
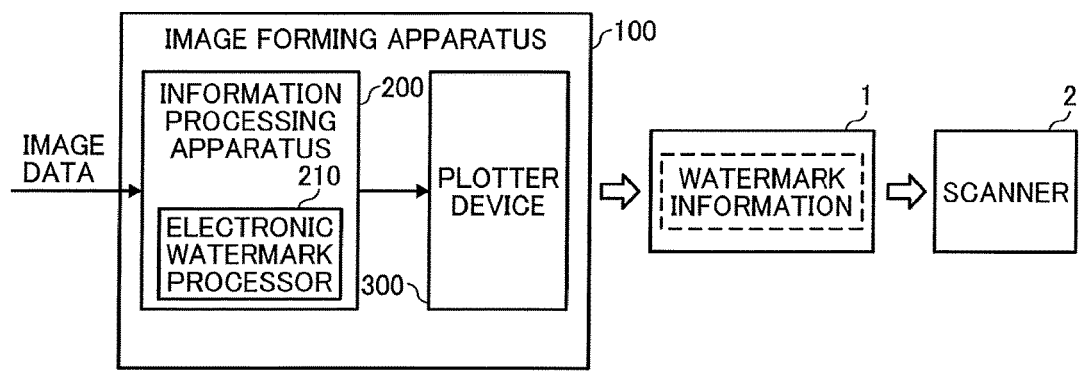
FIG. 1 is a diagram illustrating a general outline as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted as needed.

[First Embodiment]

Hereinafter, a first embodiment of the present disclosure is described with reference to the attached drawings. FIG. 1 is a diagram illustrating a general outline of an image forming apparatus in this embodiment.

An image forming apparatus 100 in this embodiment includes an information processing apparatus 200 and a plotter device 300.

The information processing apparatus 200 in this embodiment includes an electronic watermark processor 210 capable of embedding watermark information in image data input to the information processing apparatus 200 and outputting image data that the watermark information is embedded to the plotter device 300.

For example, the image data input into the information processing apparatus 200 may be transferred by a computer that communicates with the image forming apparatus 100 or read from a portable storage device such as a Universal Serial Bus (USB) memory etc. In addition, the image data input into the information processing apparatus 200 may be scanned by a scanner device included in the image forming apparatus 100.

In embedding the watermark information, the information processing apparatus 200 in this embodiment determines a position where the watermark information is embedded so that continuity of pixels of an image drawn by the image data is not interrupted.

Based on the image data that the watermark information is embedded output by the information processing apparatus 200, the plotter device 300 forms an image on a recording medium and outputs the image as printed matter 1. The printed matter 1 is an image described by embedded image data that the watermark information is embedded in the image data input to the information processing apparatus 200.

For example, the watermark information in this embodiment may be restored by scanning the printed matter 1 using the scanner apparatus 2 etc.

As described above, in this embodiment, the watermark information is embedded without segmenting the image described by the image data. Therefore, an effect on the image may be reduced.

Figure 2:
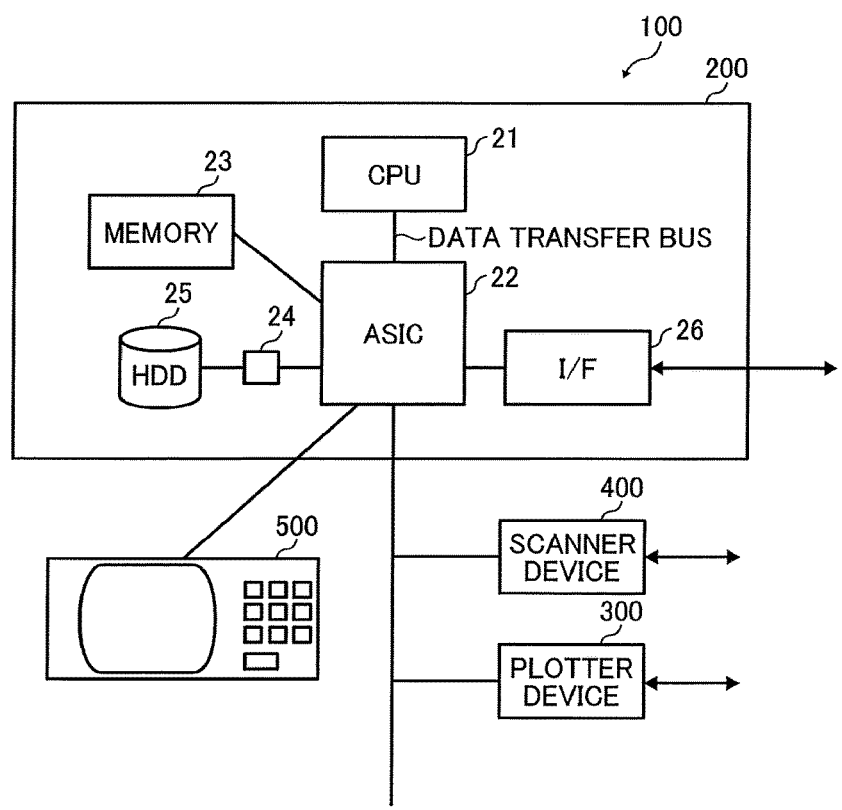
FIG. 2 is a block diagram illustrating the hardware configuration of an image forming apparatus as an embodiment of the present invention.

Next, a hardware configuration of the image forming apparatus 100 in this embodiment is described below with reference to FIG. 2. FIG. 2 is a block diagram illustrating the hardware configuration of an image forming apparatus in this embodiment.

The image forming apparatus 100 in this embodiment includes the information processing apparatus 200, the plotter device 300, the scanner device 400, and a display operation device (control panel) 500, and these components are connected via a bus.

The information processing apparatus 200 performs various operations on the image input into the image forming apparatus 100. The plotter device 300 forms an image on the recording medium based on the image data to which various operations are applied by the information processing apparatus 200 and outputs the image. The scanner device 400 is a scanner that scans an image from a document etc. and creates image data.

The display operation device 500 is a touch panel etc. and accepts operations on the image forming apparatus 100 and inputs such as configuring settings etc.

Next, a hardware configuration of the information processing apparatus 200 in this embodiment is described below. The information processing apparatus 200 in this embodiment includes a central processing unit (CPU) 21, an application specific integrated circuit (ASIC) 22, a memory 23, an encryption chip 24, a hard disk drive (HDD) 25, and an interface device 26.

The CPU 21 controls various operations of the information processing apparatus 200. The ASIC 22 performs various correcting operations on the image data input into the information processing apparatus 200 required for forming an image by the plotter device 300.

For example, the memory 23 includes a read only memory (ROM) and a random access memory (RAM) etc. and stores data as calculation results by the CPU 21 and the ASIC 22, various setting values, and programs etc.

The encryption chip 24 encrypts the input image data. The HDD 25 stores image data etc. input from the scanner device 400. The interface device 26 is an interface that enables the information processing apparatus 200 to communicate with external apparatuses.

In this embodiment, functions of the electronic watermark processor 210 (described later) are implemented by reading and executing an electronic watermark program stored in the memory 23 etc. in the information processing apparatus 200 by the CPU 21.

Next, with reference to FIG. 3, functions of the electronic watermark processor 210 included in the information processing apparatus 200 in this embodiment are described below.

Figure 3:
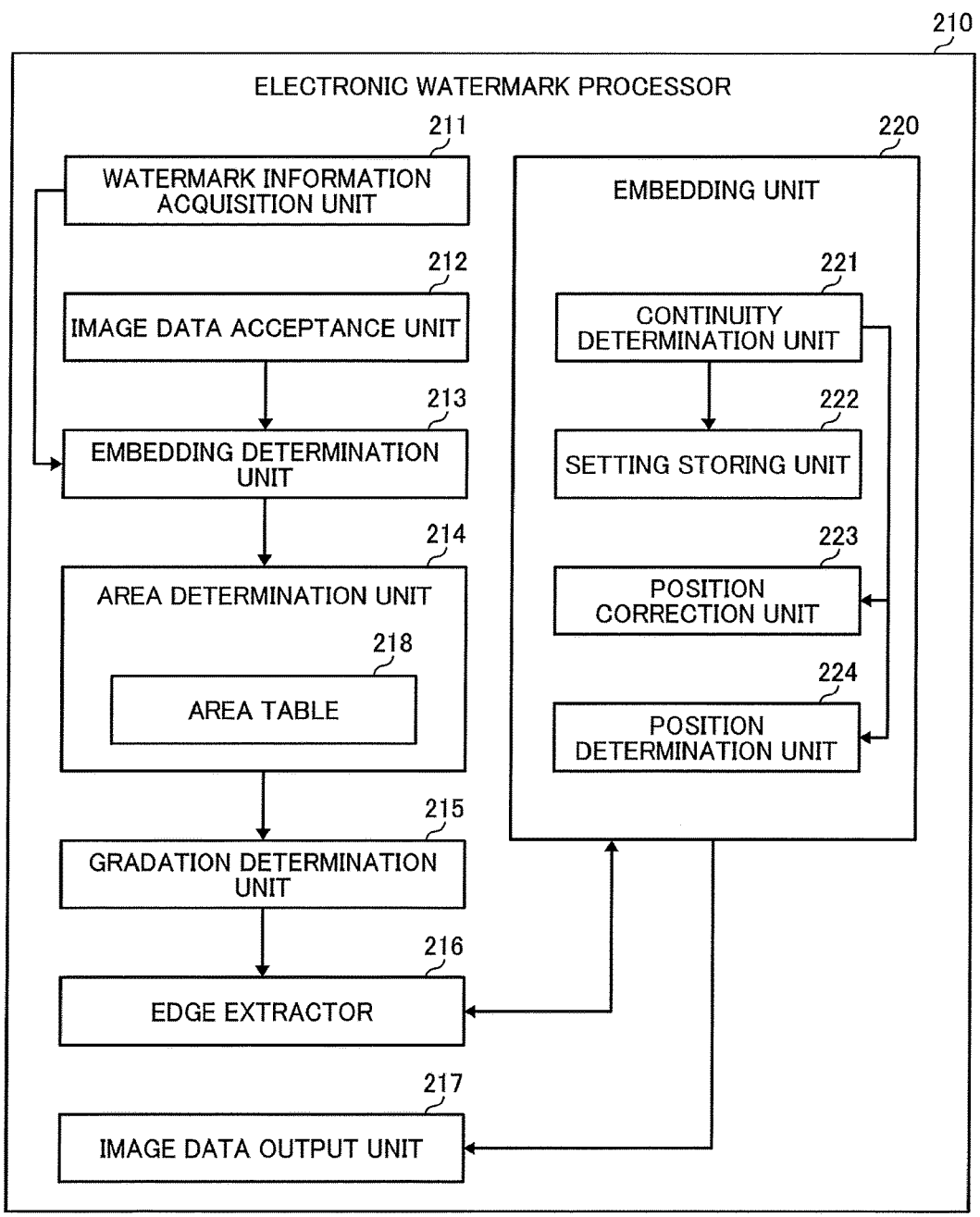
FIG. 3 is a diagram illustrating functions of an electronic watermark processor included in an information processing apparatus as an embodiment of the present invention.

FIG. 3 is a diagram illustrating functions of an electronic watermark processor included in the information processing apparatus in this embodiment.

The electronic watermark processor 210 in this embodiment includes a watermark information acquisition unit 211, an image data acceptance unit 212, an embedding determination unit 213, an area determination unit 214, a gradation determination unit 215, an edge extractor 216, an image data output unit 217, and an embedding unit 220.

The watermark information acquisition unit 211 acquires the watermark information to be embedded in the image data. For example, the watermark information in this embodiment may be preliminarily stored in the memory 23 etc. in the information processing apparatus 200 or may be generated when the watermark information is embedded.

For example, the watermark information in this embodiment is information indicating date/time when the image data is accepted, a name of a user who created the image data, or information indicating a file name of the image data etc. In this embodiment, a content of the watermark information may be preliminarily determined by an administrator etc. of the image forming apparatus 100 (the information processing apparatus 200) or may be determined by a user of the image forming apparatus 100.

The image data acceptance unit 212 accepts the image data to be input into the information processing apparatus 200. More specifically, the image data to be input into the information processing apparatus 200 may be transferred by a computer connected to the information processing apparatus 200 or may be scanned by the scanner device 400. The image data may be input into the information processing apparatus 200 using other methods. Methods for inputting the image data are not limited.

The embedding determination unit (determining unit) 213 determines whether or not the watermark information is embedded in the input image data. Whether or not the watermark information is to be embedded may be determined based on a setting configured by the administrator of the image forming apparatus 100 or the user etc. of the image forming apparatus 100 or may be determined in accordance with a name of a user who created the image data.

The area determination unit 214 determines an area where the watermark information is to be embedded in the input image data. In this embodiment, for example, if it is assumed that the watermark information is 280 bit information, the area determination unit 214 refers to the area table 218 to determine the area where each bit of the watermark information is embedded for each bit of the watermark information. The area table 218 is described in detail later.

The gradation determination unit 215 determines whether or not gradation exists in the image within the area determined by the area determination unit 214. More specifically, regarding the image within the determined area, the gradation determination unit 215 determines whether or not a difference between gradation values for each pixel is equal to or more than a predetermined value. Subsequently, if the gradation value is equal to or more than the predetermined value, the gradation determination unit 215 determines that the gradation exists in the image within the area.

The edge extractor 216 extracts an edge of the image in the image data. The edge extractor 216 in this embodiment may extract the edge on the image data accepted by the image data acceptance unit 212 or may extract the edge on the image data passed by the embedding unit 220.

The image data output unit 217 outputs image data to the plotter device 300. The image data output by the image data output unit 217 may be image data that the watermark information is embedded or may be image data that the watermark information is not embedded.

The embedding unit 220 embeds the watermark information by 1 bit in the area determined by the area determination unit 214 in the image data. The embedding unit 220 is further described in detail below.

The embedding unit 220 in this embodiment includes a continuity determination unit 221, a setting storing unit 222, a position correction unit 223, and a position determination unit 224.

The continuity determination unit 221 determines whether or not the watermark information is to be placed to keep continuity of pixels in the image described by the image data when the watermark information is embedded in the image data. For simplicity, the above-case that the watermark information is to be placed to keep continuity of pixels in the image is referred to as "watermark information is continuous with the image".

The setting storing unit 222 stores settings used for correcting a position of the watermark information. For example, these setting are preliminarily configured in the image forming apparatus 100 by the administrator etc.

If the continuity determination unit 221 determines that the watermark information is not continuous with the image, the position correcting unit 223 corrects (modifies) a position where the watermark information is embedded in accordance with the settings stored in the setting storing unit 222.

The position determination unit 224 determines a position that the continuity determination unit 221 determines that the watermark information is continuous with the image as a position where the watermark information is embedded.

Components included in the embedding unit 220 in this embodiment are described in detail later.

Figure 4:
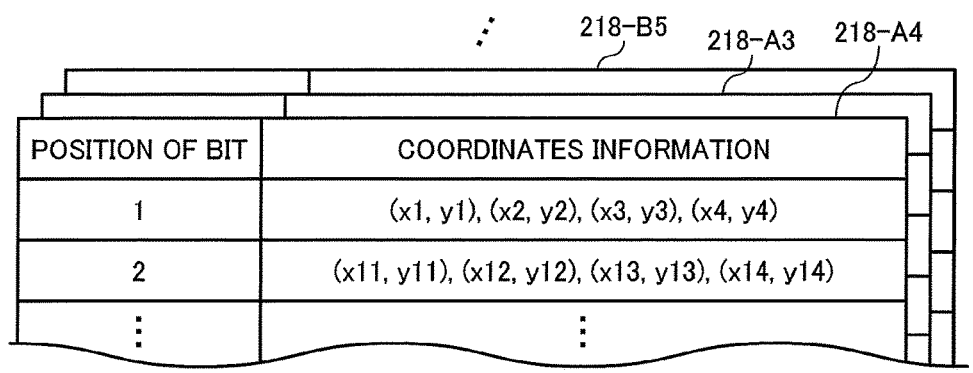
FIG. 4 is a diagram illustrating an area table as an embodiment of the present invention.

Next, with reference to FIG. 4, the area table 218 in this embodiment is described below. FIG. 4 is a diagram illustrating an area table in this embodiment.

The area table 218 in this embodiment is assigned for each paper size. In FIG. 4, for example, it is assumed that the table is referred when image data input in the image forming apparatus 100 is output on paper whose size is A4.

The area table 218-A4 in this embodiment includes a position of a bit and coordinate information as information items associated with each other. That is, in the area table 218, that is, in the watermark information, information indicating a number of the bit corresponds to the coordinate information indicating the area to be embedded with such bit.

In FIG. 4, for example, it is determined that information of the first bit in the watermark information is embedded in an area indicated by four points "(x1, y1), (x2, y2), (x3, y3), and (x, y4).

In this embodiment, if the paper size that the image data is output is A3, the area table 218-A3 is referred. If the paper size that the image data is output is B5, the area table 218-B5 is referred.

Figure 5:
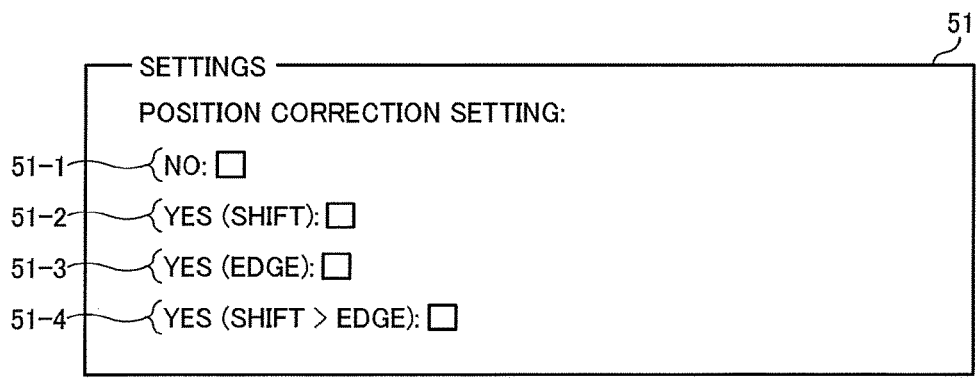
FIG. 5 is a diagram illustrating settings stored in a setting storing unit as an embodiment of the present invention.

Next, with reference to FIG. 5, settings stored in the setting storing unit 222 in this embodiment are described below. FIG. 5 is a diagram illustrating settings stored in the setting storing unit 222 in this embodiment.

A screen 51 in FIG. 5 illustrates an example of a setting screen displayed on the display operation unit 500 etc. for example.

The screen 51 displays an option 51-1 for selecting whether or not to correct a position where the watermark information is embedded to suppress degradation in image quality along with checkboxes for options 51-2 to 51-4.

In the screen 51, if the checkbox for the option 51-1 is checked, the position where the watermark information is embedded is not corrected regardless of the continuity between the watermark information and the image.

In the screen 51, if any one of the checkboxes for the options 51-2 to 51-4 is checked and the watermark information is not continuous with the image, the position where the watermark information is embedded is corrected. In this case, the position where the watermark information is embedded is corrected using the method selected by the options 51-2 to 51-4.

If the option 51-2 is selected, the position correction unit 223 shifts the position where the watermark information is embedded. More specifically, the position correction unit 223 changes the position where the watermark information is embedded to a position where the watermark information does not cut in the middle of continued pixels in the image.

If the option 51-3 is selected, the position correction unit 223 modifies the position where the watermark information is embedded to the edge of the image.

If the option 51-4 is selected, the position correction unit 223 first shifts the position where the watermark information is embedded. Even after the operation, if the continuity determination unit 221 determines that there is no continuity, the position where the watermark information is embedded is changed to the edge of the image. That is, the option 51-4 configures the setting "prioritize shift" that prioritize shifting as a method that modifies the position where the watermark information is embedded. The operation of correcting the position where the watermark information is embedded is described in detail later.

Next, with reference to FIGS. 6 and 7, operation of the electronic watermark processor 210 in the information processing apparatus 200 in this embodiment is described below.

Figure 6:
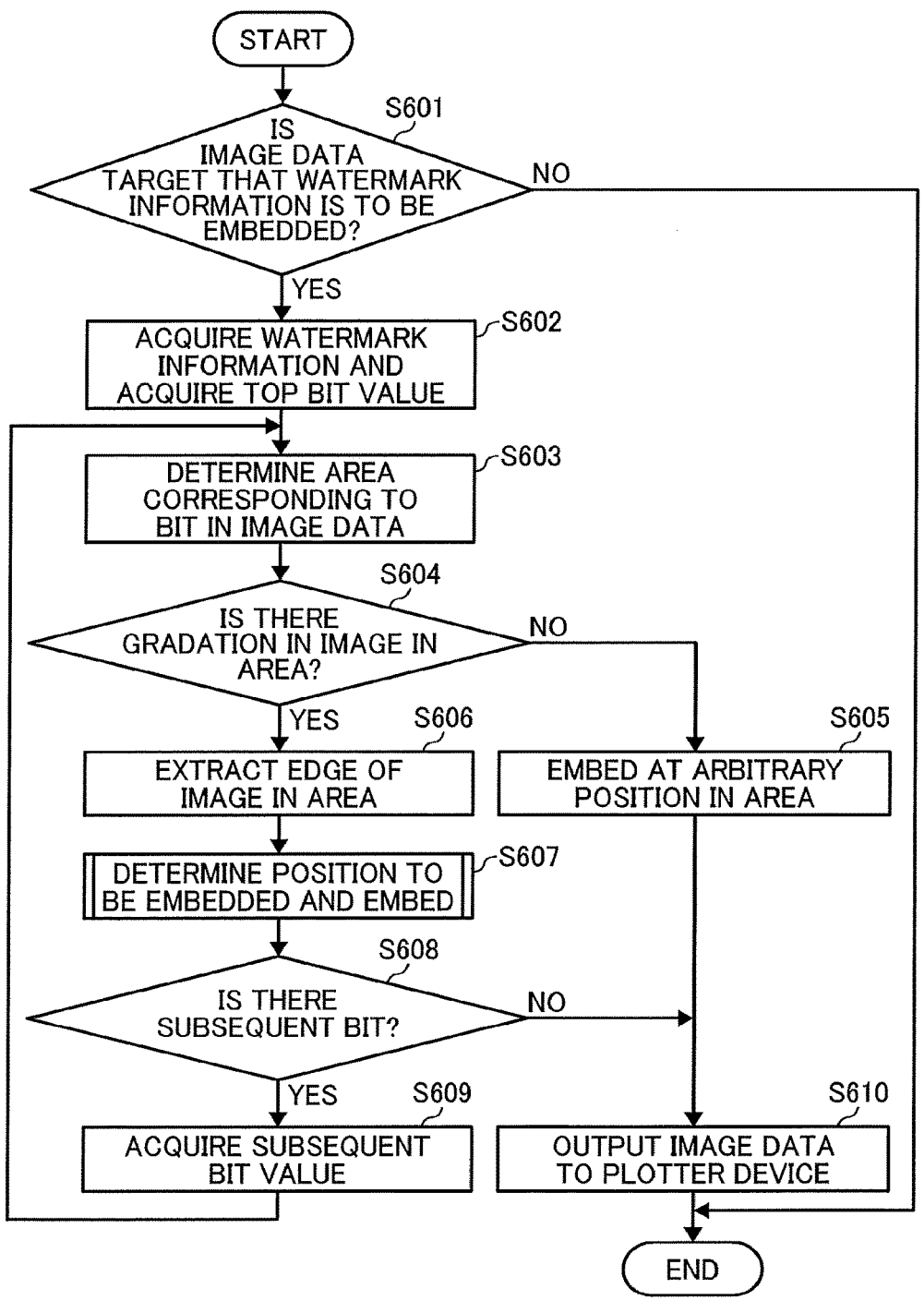
FIG. 6 is a flowchart illustrating an operation performed by an electronic watermark processor as an embodiment of the present invention.

FIG. 6 is a flowchart illustrating an operation performed by the electronic watermark processor 210 in this embodiment.

In the electronic watermark processor 210 in this embodiment, after the image data acceptance unit 212 accepts the image data, the embedding determination unit 213 determines whether or not the accepted image data is target image data that the watermark information is to be embedded in S601. More specifically, the embedding determination unit (determining unit) 213 determines whether or not the watermark information is to be embedded in the input image data in accordance with the settings etc.

In S601, if the embedding determination unit 213 determines that the watermark information is not to be embedded in the image data, the electronic watermark processor 210 finishes the operation.

In S601, if the embedding determination unit 213 determines that the watermark information is to be embedded in the image data, in the electronic watermark processor 210, the watermark information acquisition unit 211 acquires the watermark information and acquires the top bit value of the watermark information in S602. More specifically, for example, if the content of the watermark information is date and time, the watermark information acquisition unit 211 converts the current date and time into digitalized signals to acquire "1" if the top bit value is "1" or "0" if the top bit value is "0".

Next, in the electronic watermark processor 210, the area determination unit 214 refers to the area table 218 and determines an area corresponding to the position of the bit whose value was acquired in the watermark information in S603.

Next, in the electronic watermark processor 210, the gradation determination unit 215 determines whether or not there is gradation in the image within the area determined in S603 in the image data in S604. More specifically, the gradation determination unit 215 determines whether or not a difference between adjacent pixels within the area becomes equal to or more than a threshold value.

In S604, if there is no gradation, in the electronic watermark processor 210, in S605, the embedding determination unit 220 embeds the acquired bit value in the watermark information in an arbitrary position within the area determined in S603, and the operation proceeds to S610 (described later).

In S604, if the gradation exists, in the electronic watermark processor 210, the edge extractor 216 extracts an edge of the image within the determined area in S606. It should be noted that the operation of extracting the edge of the image within the area may be implemented using any of the general methods.

Next, in the electronic watermark processor 210, the embedding unit 220 determines the position where watermark information is embedded and performs embedding in S607. More specifically, in the area where the watermark information is to be embedded determined in S603, the embedding unit 220 determines the position where a part of the acquired watermark information (i.e., a pixel indicating information for 1 bit) is to be embedded and performs embedding. The operation in S607 is described in detail later.

Next, the electronic watermark processor 210 determines whether or not subsequent bits exist in the watermark information in S608. In S608, if the subsequent bits exist, in the electronic watermark processor 210, the watermark information acquisition unit 211 acquires a subsequent bit value in S607, and the operation goes back to S603.

In S608, if the subsequent bits do not exist, that is, embedding of the watermark information in the image data is finished, in the electronic watermark processor 210, the image data output unit 217 outputs the image data that the watermark information is embedded to the plotter device 300 in S610, and the operation ends.

Next, with reference to FIG. 7, an operation performed by the embedding unit 220 in this embodiment is described below. FIG. 7 is a flowchart illustrating an operation performed by an electronic watermark processor in this embodiment. In FIG. 7, the operation in S607 in FIG. 6 performed by the embedding unit 220 is described.

After the edge of the image in the area is extracted, in the embedding unit 220 in this embodiment, the continuity determination unit 221 sets a pixel whose edge (pixel gradient) is the sharpest as a temporary embedding position in S701. The pixel whose edge is the sharpest corresponds to a pixel that a difference of gradation value (that is, pixel gradient) between adjacent pixels becomes the largest.

Next, the continuity determination unit 221 expands the image data within the area into the memory and embeds the watermark information for 1 bit in the temporary embedding position in S702. In this case, the memory where the image data is expanded is the memory 23 etc. for example.

Next, the continuity determination unit 221 passes the image data that the watermark information is embedded in S702 to the edge extractor 216 to request to extract the edge in S703.

Next, with reference to the result of extracting edge, the continuity determination unit 221 digitalizes the gradation value for each pixel within the area in S704.

Next, the continuity determination unit 221 determines whether or not the watermark information for 1 bit embedded in the temporary embedding position is continuous with the image other than the watermark information in S705. More specifically, among pixels adjacent to the pixel that the watermark information is embedded, the continuity determination unit 221 determines whether or not there are any pixels opposing via the pixel that the watermark information is embedded, each having a digitalized value corresponding to the value of the pixel that the watermark information is embedded, exist. The operation performed by the continuity determination unit 221 is described in detail later.

In S705, if the continuity determination unit 221 determines that the watermark information for 1 bit embedded in the temporary embedding position is continuous with the image other than the watermark information, in the embedding unit 220, the position determining unit 224 determines the temporary embedding position as the position where the watermark information is embedded in S706, and the operation proceeds to S608.

In S705, if the continuity determination unit 221 does not determine that the watermark information for 1 bit embedded in the temporary embedding position is continuous with the image other than the watermark information, in the embedding unit 220, the position correction unit 223 refers to the setting storing unit 222 and determines whether or not a correcting method of embedding position is "shift" (i.e., option 51-2 in FIG. 5) in S707.

In S707, if the position correction unit 223 determines that the correcting method of embedding position is "shift", the position correction unit 223 shifts the position where the watermark information is embedded to a position 1 bit away from the current embedding position in S708, and the operation goes back to S703. It should be noted that the operation of correcting the position where the watermark information is embedded in this embodiment is described in detail later.

In S707, if the position correction unit 223 determines that the correcting method of embedding position is not "shift", the position correction unit 223 refers to the setting storing unit 222 and determines whether or not a correcting method of embedding position is "prioritize shift" (i.e., option 51-4 in FIG. 5) in S709.

In S709, if the position correction unit 223 determines that the correcting method of embedding position is not "prioritize shift", the setting stored in the setting storing unit 222 is "edge" (i.e., option 51-3 in FIG. 5). As a result, the embedding unit 220 proceeds to S711 (described later).

In S709, if the position correction unit 223 determines that the correcting method of embedding position is "prioritize shift", the continuity determination unit 221 determines whether or not the continuity determination unit 221 has already performed the determination at all positions where the 1 bit watermark information may be embedded within the area in S710. More specifically, the position correction unit 223 determines whether or not the continuity determination unit 221 has already performed the determination at all pixels within the area.

In S710, when the continuity determination unit 221 has not performed the determination at all pixels, the embedding unit 220 proceeds to S708.

In S710, when the continuity determination unit 221 has already performed the determination at all pixels, the position correction unit 223 modifies the position where the 1 bit watermark information is embedded to the edge of the image from the temporary embedding position in S711, and the operation proceeds to S706.

Next, with reference to FIGS. 8 to 12, the operation performed by the embedding unit 220 is specifically described below.

Figure 8A:
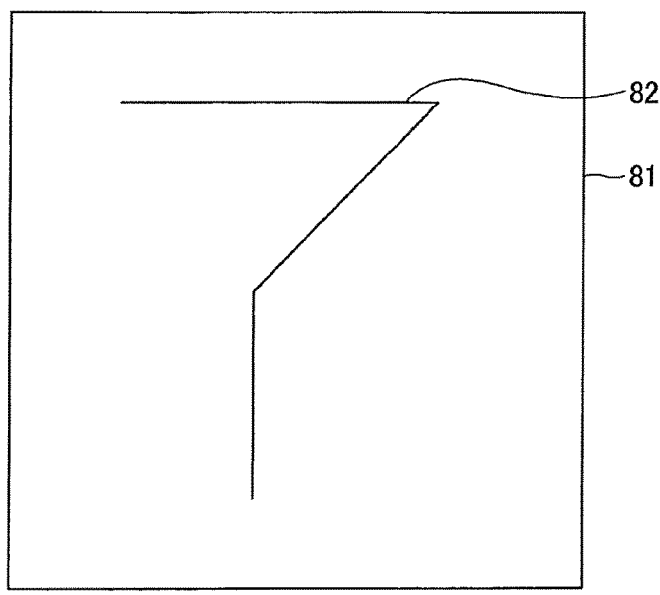
FIGS. 8A and 8B are diagrams illustrating image data as an embodiment of the present invention.
Figure 8B:
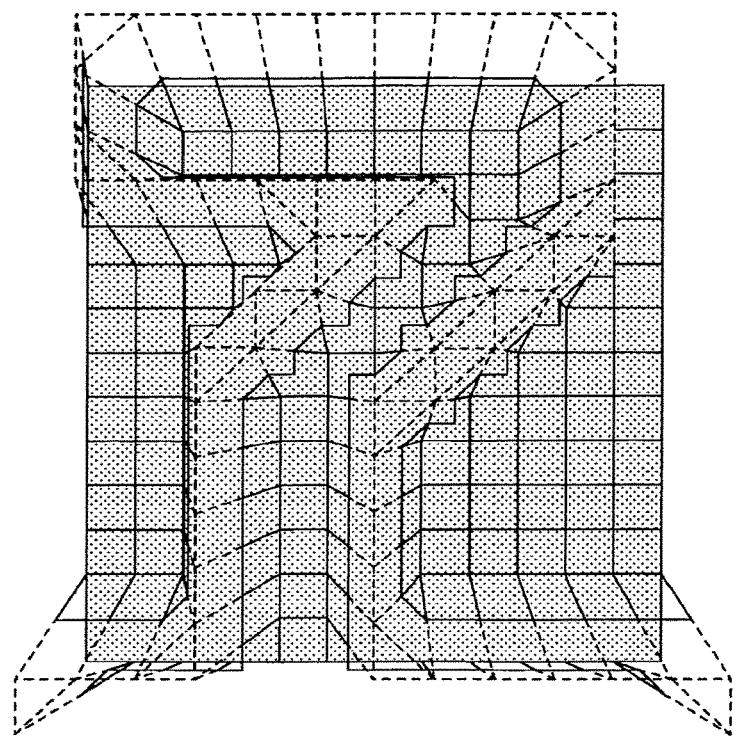

FIGS. 8A and 8B are diagrams illustrating image data in this embodiment. FIG. 8A is a diagram illustrating an image that the watermark information is embedded, and FIG. 8B is a diagram illustrating an edge extracted from the image in FIG. 8A.

In this embodiment, for example, if it is assumed that 8 bit watermark information is embedded in an image 81 indicated by the input image data, the area determination unit 214 determines 8 pixels in the image 81 associated with positions of each bit.

FIG. 8B illustrates the edge of the image 82 extracted from the image data indicating the image 81. In FIG. 8B, a solid line indicates a line connecting pixels whose gradation values are positive, and a dash line indicates a line connecting pixels whose gradation values are negative.

FIG. 9 is a diagram illustrating an area determined by an area determination unit in this embodiment. In FIG. 9, gradation values for each pixel in the image 81 are illustrated.

In addition, in this embodiment, it is assumed that resolution of the image 81 indicated by the input image data and resolution of the plotter device 300 are each 600 dpi.

In this embodiment, for example, it is indicated that an area 91 is an area where a value "0" for bit 1 of the watermark information is embedded.

In the below description, with reference to FIGS. 10 to 12, an operation performed by the embedding unit 220 if a pixel 92 in the area 91 is considered as the temporary position where the watermark information is embedded.

Figure 10:
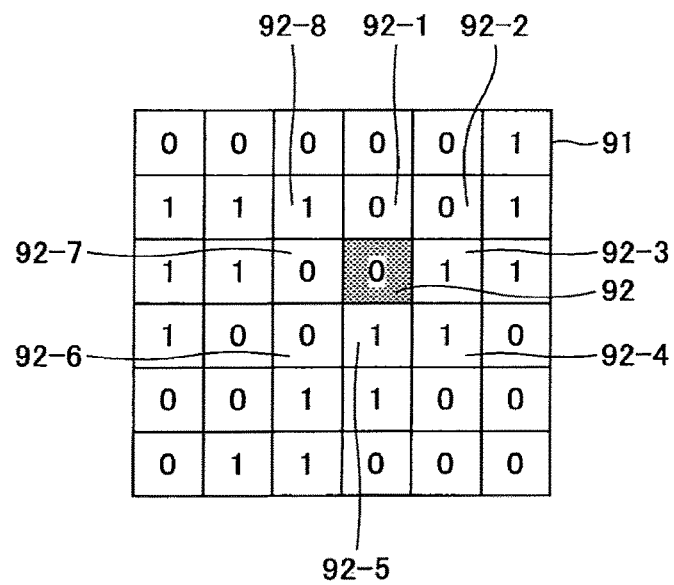
FIG. 10 is a diagram illustrating an operation of determining continuity as an embodiment of the present invention.

FIG. 10 is a diagram for explaining operation of determining continuity in this embodiment. In FIG. 10, gradation values for all pixels in the area 91 are digitalized.

In FIG. 10, the pixel 92 in the area 91 is considered as the temporary embedding position for bit 1 of the watermark information. As a result, in FIG. 10, after expanding image data in the area 91 of the image 81 into the memory and extracting an edge again after replacing a gradation value "−4" of the pixel 92 with the value "0" for bit 1 of the watermark information, the operation of digitalization is performed. That is, FIG. 10 illustrates a status after performing the operation in S704 in FIG. 7.

Here, among pixels adjacent to the pixel 92, the continuity determination unit 221 in this embodiment determines whether or not pixels opposing via the pixel 92 each having a digitalized value corresponding to the value of the pixel 92 exist.

In FIG. 10, pixels 92-1 to 92-8 are adjacent to the pixel 92. Among pixels 92-1 to 92-8, pixels whose digitalized gradation value becomes "0", that is, the value same as the pixel 92 are four pixels 92-1, 92-2, 92-6, and 92-7.

Furthermore, among four pixels 92-1, 92-2, 92-6, and 92-7, the pixels opposing via the pixel 92 are pixels 92-2 and 92-6.

As a result, even if the watermark information is embedded in the pixel 92 in the area 91, the continuity determination unit 221 in this embodiment determines that the pixel 92 is continuous with pixels other than the pixel 92 and determines the pixel 92 as the position where bit 1 of the watermark information is embedded.

Next, with reference to FIG. 11, a case that it is determined that there is no continuity assuming the pixel 92 as the temporary position where bit 1 of the watermark information is embedded is described below. FIG. 11 is a diagram illustrating an operation of modifying a position to be embedded in this embodiment. In FIG. 11, a case that the position where the watermark information is embedded is modified by "shifting".

In the embedding unit 220, if it is determined that there is no continuity after embedding the watermark information in the temporary embedding position, the position correction unit 223 modifies the embedding position.

The position correction unit 223 modifies the position where bit 1 of the watermark information is to be embedded into the pixel 92-3 shifted from the pixel 92 by 1 pixel and determines the position of the pixel 92-3 as the temporary embedding position.

Figure 11:
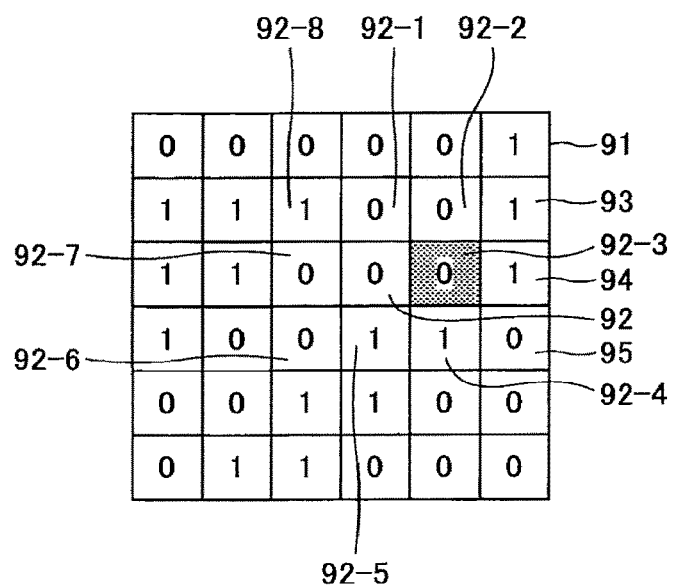
FIG. 11 is a diagram illustrating an operation of modifying a position to be embedded as an embodiment of the present invention.

In FIG. 11, after replacing a gradation value "3" of the pixel 92-3 in image data of the area 91 expanded into the memory with a value "0" for bit 1 in the watermark information and extracting an edge again, the operation of digitalization is performed.

Pixels 92, 93, 94, 95, and 92-2 to 92-5 are adjacent to the pixel 92-3. Among the pixels adjacent to the pixel 92-3, pixels whose digitalized gradation value becomes "0", that is, the value same as that of the pixel 92-3 are four pixels 92, 92-1, 92-2, and 95.

Furthermore, among the four pixels, pixels located opposite with each other via the pixel 92-3 are pixels 92-1 and 95.

As a result, even if the watermark information is embedded in the pixel 92-3 in the area 91, the continuity determination unit 221 in this embodiment determines that the pixel 92-3 is continuous with pixels other than the pixel 92-3 and determines the pixel 92-3 as the position where bit 1 of the watermark information is embedded.

Next, with reference to FIG. 12, a case that the modification of embedding position is set to "edge" is described below. FIG. 12 is a diagram illustrating an operation of modifying a position to be embedded in this embodiment. In FIG. 12, a case that the position where the watermark information is embedded is modified by being moved to "edge".

After embedding the watermark information in the temporary embedding position, if it is determined that there is no continuity, the position correction unit 223 moves the position where bit 1 for the watermark information is embedded into the edge of the image.

In FIG. 12, it is assumed that pixels 93 and 94 are detected as the edge of the image 82. In this case, the position correction unit 223 may consider any one of the pixels 93 and 94 as the position where the watermark information is embedded. In FIG. 12, the pixel 96 is regarded as the position where the watermark information is embedded, and a digitalized gradation value of the pixel 96 is regarded as "0".

As described above, in this embodiment, by embedding the watermark information, if the continuity of the image is blocked, the position where the watermark information is embedded is modified to a position that the continuity of the image is not blocked. In addition, in this embodiment, in case it is impossible to detect the position that the continuity of the pixels in the image is not blocked, the position where the watermark information is embedded is modified to the edge of the image.

As described above, in this embodiment, by determining the position where the watermark information is embedded, it is possible to prevent a part of an image from being lost when image data is output by embedding the watermark information in the image data, preventing image quality from being deteriorated. That is, in this embodiment, effects on images by embedding watermark information may be reduced.

An effect of this embodiment is described below with reference to FIGS. 13A, 13B, 14A, and 14B. FIGS. 13A and 13B are diagrams for explaining an effect in this embodiment. FIG. 13A is a diagram illustrating a case that the watermark information is embedded in an area 131, and FIG. 13B is a diagram illustrating a case that the watermark information is embedded in an area 132.

In FIG. 13A, even if the watermark information is embedded in the area 131 in the middle of pixels in the image, the continuity of the image is not interrupted, as continuity is kept for at least a part of the pixels in the image.

In FIG. 13B, the watermark information is embedded in the area 132 as the edge of pixels in the image. As a result, an impact on the whole shape of the image is reduced, reducing the impact on the image.

Figure 14A:
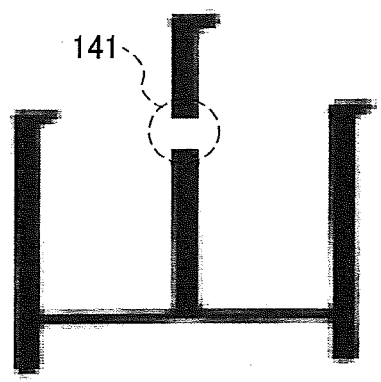
FIGS. 14A and 14B are diagrams illustrating an effect as an embodiment of the present invention.
Figure 14B:

FIGS. 14A and 14B are diagrams illustrating comparative examples for explaining an effect in this embodiment. FIG. 14A is a diagram illustrating a case where the continuity of the image is blocked, and FIG. 14B is a diagram illustrating a case that the watermark information is embedded in frequency space.

In FIG. 14A, a character is divided by an area 141 that the watermark information is embedded. In FIG. 14B, in an image 142-1, watermark information appears on printed matter, affecting visibility of the image. In addition, in FIG. 14B, in an image 142-2, watermark information printed on printed matter is pale, and the watermark information may not be scanned when the scanner apparatus 2 scans the image 142-2.

In this embodiment, as illustrated in FIG. 14, by embedding the watermark information, the cases that the image is divided and the visibility is spoiled may be prevented.

[Second Embodiment]

Hereinafter, a second embodiment of the present disclosure is described with reference to FIGS. 15 to 20. The second embodiment is substantially similar to the first embodiment, except that resolution of the input image data is not the same as resolution of the plotter apparatus that outputs the image data. As a result, in the below description of the second embodiment, only the point different from the first embodiment is described, and the same symbols as the first embodiment are assigned to the functional components similar to the first embodiment, omitting descriptions for those components.

Figure 15:
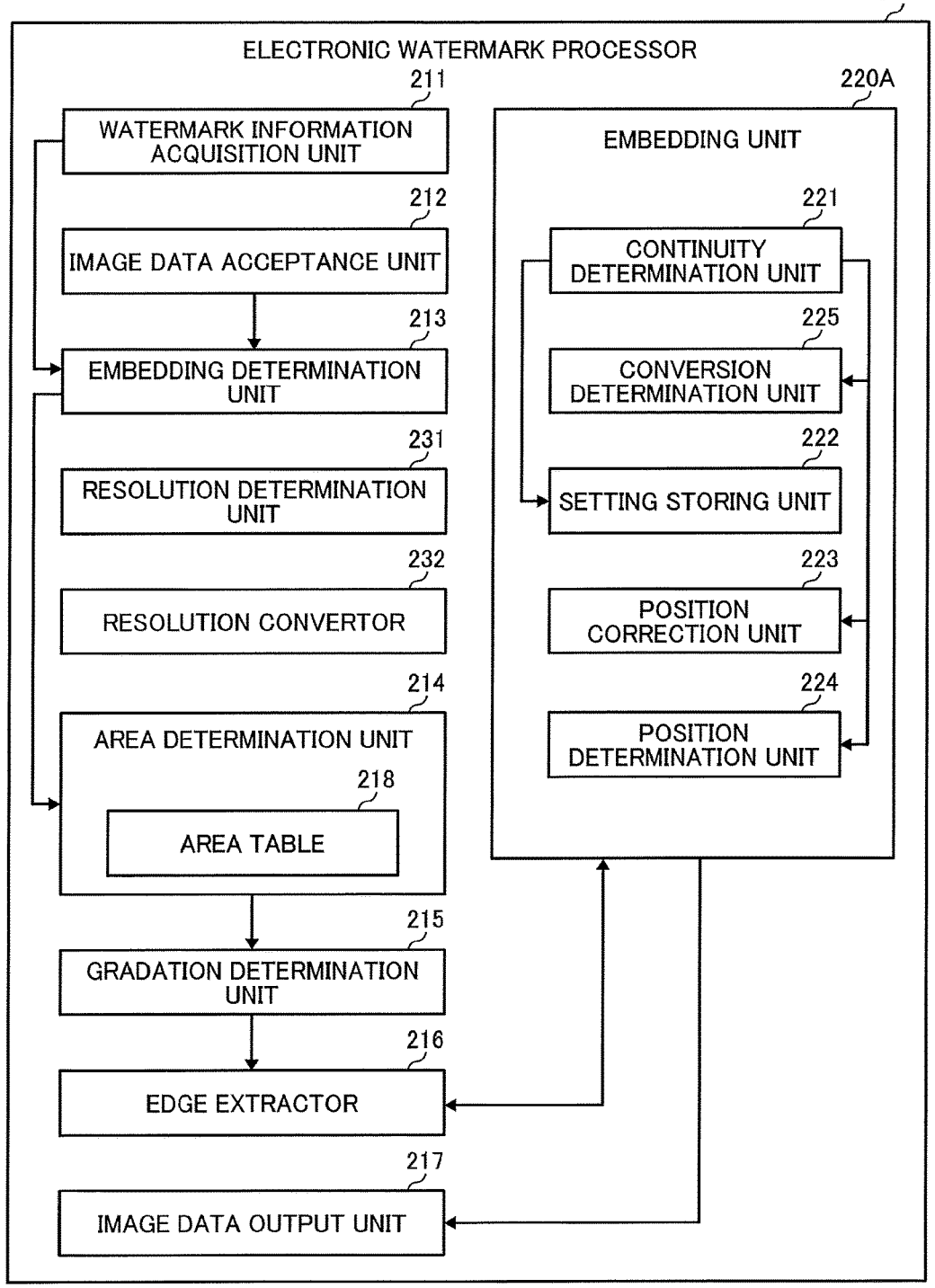
FIG. 15 is a diagram illustrating functions of an electronic watermark processor as an embodiment of the present invention.

FIG. 15 is a diagram illustrating functions of an electronic watermark processor 210A in this embodiment.

In addition to components included in the electronic watermark processor 210 in the first embodiment, the electronic watermark processor 210A in this embodiment includes a resolution determination unit 231 and a resolution convertor 232. In addition, the electronic watermark processor 210A in this embodiment includes an embedding unit 220A instead of the embedding unit 220.

The resolution determination unit 231 determines whether or not the resolution of the image data accepted by the image data acceptance unit 212 corresponds to the resolution of the plotter device 300.

If the resolution of the image data accepted by the image data acceptance unit 212 does not correspond to the resolution of the plotter device 300, the resolution convertor 232 converts the resolution of the image data into the resolution of the plotter device 300.

In addition to components included in the embedding unit 220 in the first embodiment, the embedding unit 220A in this embodiment includes a conversion determination unit 225. The conversion determination unit 225 determines whether or not the resolution of the image in the area that the watermark information is to be embedded is converted.

Next, with reference to FIGS. 16 and 17, operation of the electronic watermark processor 210A in this embodiment is described below.

Figure 16:
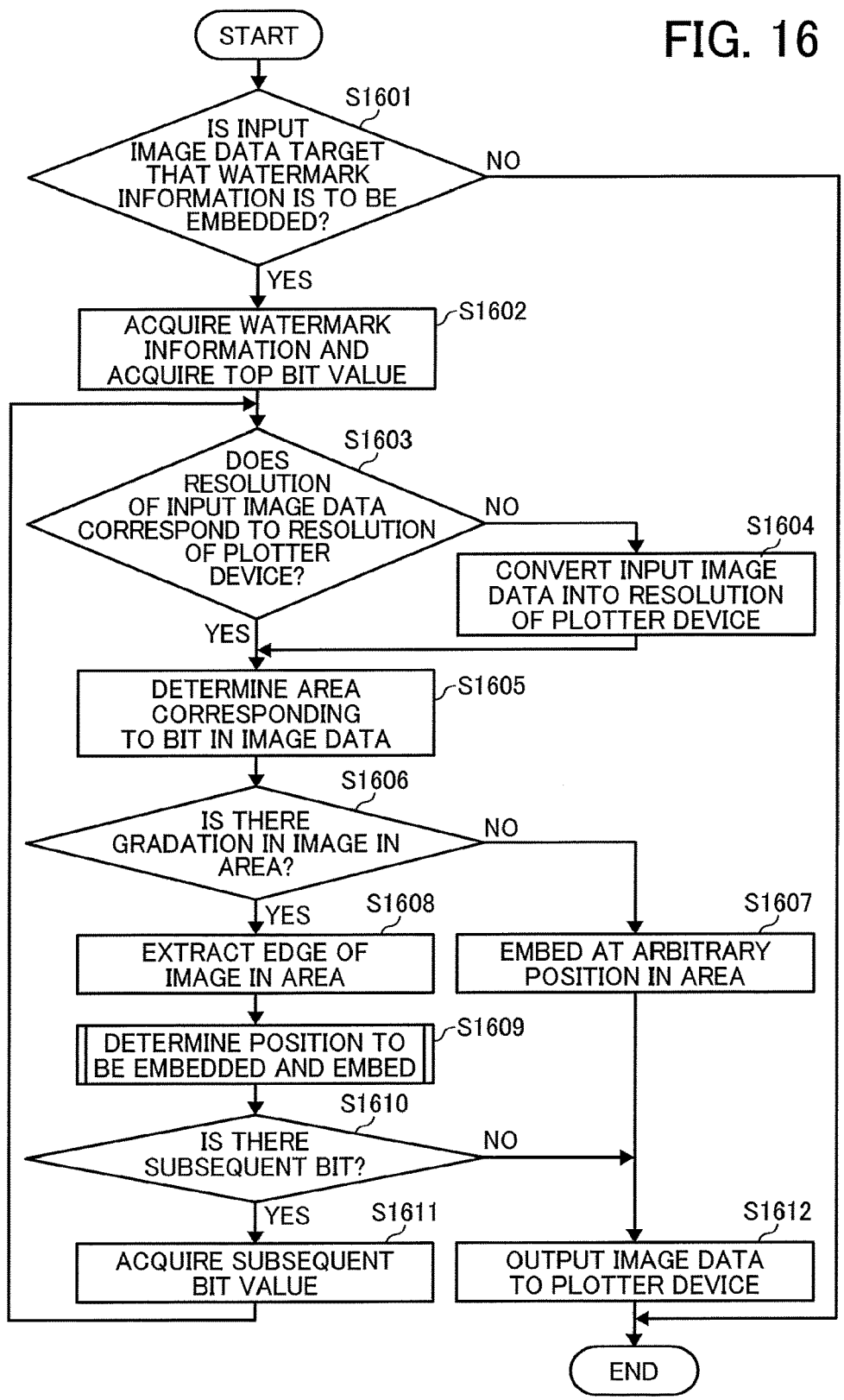
FIG. 16 is a flowchart illustrating an operation performed by an electronic watermark processor as an embodiment of the present invention.

FIG. 16 is a flowchart illustrating an operation performed by the electronic watermark processor 210A in this embodiment.

The operations in steps S1601 and S1602 in FIG. 16 are the same as the operations in steps S601 and S602 in FIG. 6. Therefore, descriptions for those operations are omitted.

Subsequent to S1602, in the electronic watermark processor 210A, the resolution determination unit 231 determines whether or not the resolution of the input image data corresponds to the resolution of the plotter device 300 connected to the information processing apparatus 200 in S1603. It should be noted that it is assumed that the resolution determination unit 231 in this embodiment stores the resolution of the plotter device 300 connected to the information processing apparatus 200.

In S1603, if the resolution does not correspond, in the electronic watermark processor 210A, the resolution convertor 232 converts the resolution of the input image data into the resolution of the plotter device 300 in S1604, and the operation proceeds to S1605.

In S1603, if the resolution corresponds, the electronic watermark processor 210A proceeds to step S1605 (described later).

The operation in steps S1605 to S1608 is the same as the operation in steps S603 to S606 in FIG. 6. Therefore, the description for the operation is omitted. An operation performed by the embedding unit 220A in S1609 is described in detail later.

The operation in steps S1610 to S1612 is the same as the operation in steps S608 to S610 in FIG. 6. Therefore, the description for the operation is omitted.

Next, with reference to FIG. 17, an operation performed by the embedding unit 220A in this embodiment is described below.

Figure 17:
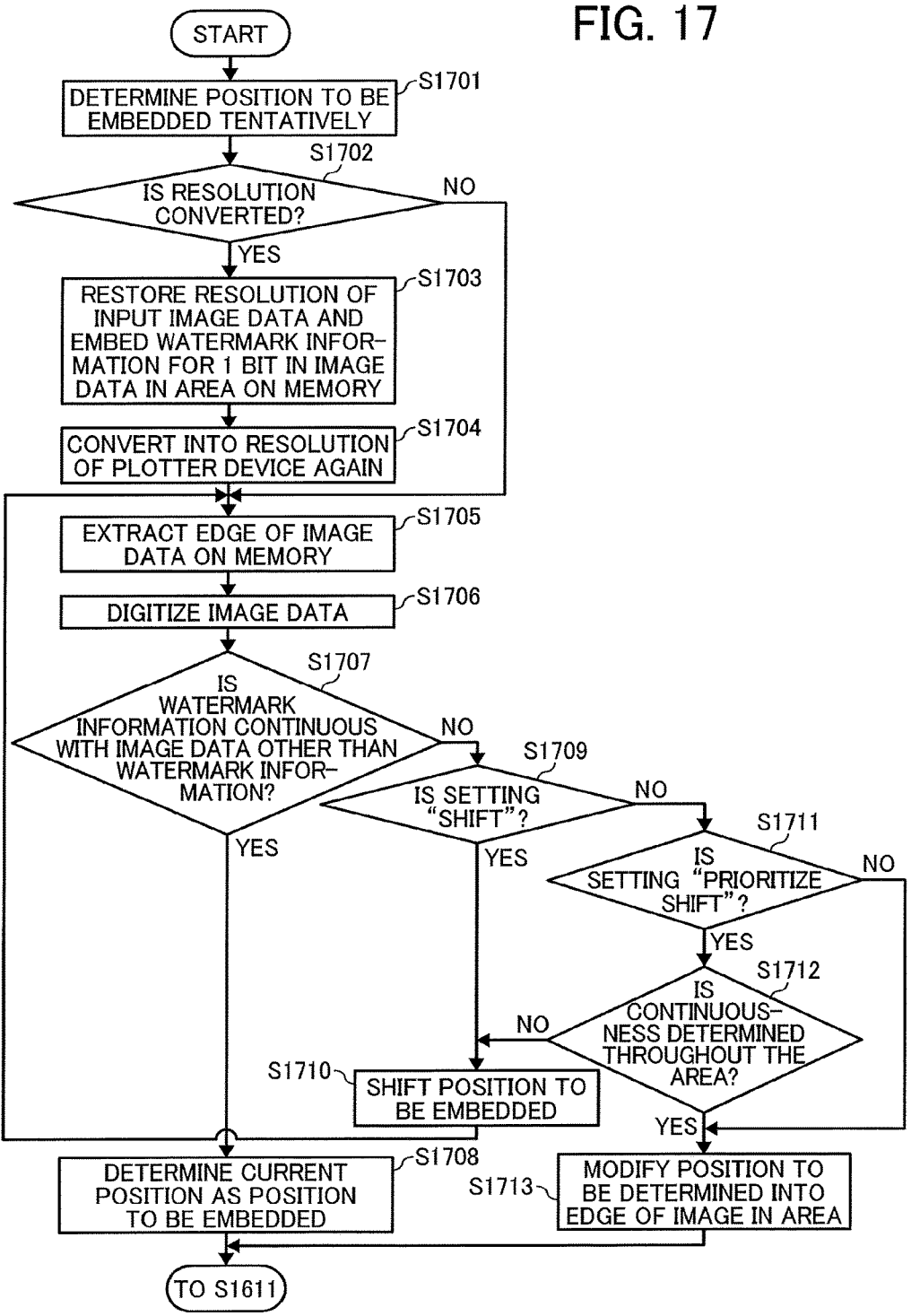
FIG. 17 is a flowchart illustrating an operation performed by an electronic watermark processor as an embodiment of the present invention.

FIG. 17 is a flowchart illustrating an operation performed by the electronic watermark processor 220A in this embodiment.

In FIG. 17, the operation in S1609 in FIG. 16 performed by the embedding unit 220A is illustrated.

After the edge of the image in the area is extracted, in the embedding unit 220A in this embodiment, the continuity determination unit 221 sets a pixel whose edge is the sharpest as a temporary embedding position in S1701.

Next, in the embedding unit 220A, the conversion determination unit 225 determines whether or not the resolution of the image in the area is converted in S1702. In S1702, if the resolution of the image is not converted, the operation proceeds to step S1705 (described later).

In S1702, if the resolution of the image is converted, in the embedding unit 220A, the resolution converter 232 converts the resolution of the image in the area into the resolution of the input image data. Subsequently, the embedding unit 220 embeds bit 1 of the watermark information in the temporary embedding position in the image whose resolution is converted back into the resolution when the image was input.

Next, in the embedding unit 220, the resolution convertor 232 converts the resolution of the image that the watermark information is embedded into the resolution of the plotter device 300 in S1704.

Figure 7:
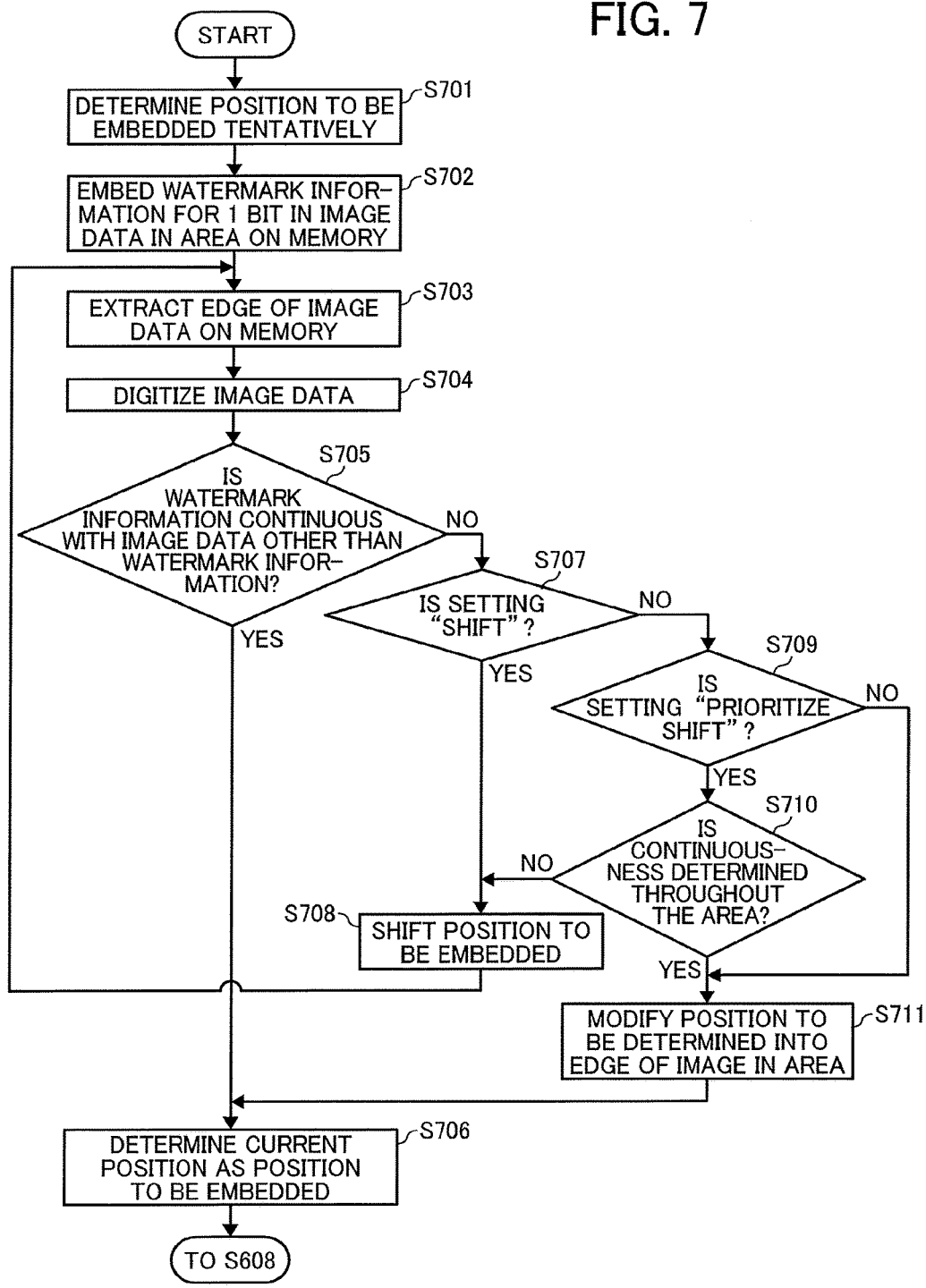
FIG. 7 is a flowchart illustrating an operation performed by an electronic watermark processor as an embodiment of the present invention.

The operation in steps S1705 to S1713 is the same as the operation in steps S703 to S710 in FIG. 7. Therefore, the description for the operation is omitted.

Next, with reference to FIGS. 18 to 20, an operation performed by the embedding unit 220A in this embodiment is described below. In the below description, it is assumed that the resolution of the input image data is 300 dpi and the resolution of the plotter device 300 is 600 dpi.

Figure 18:
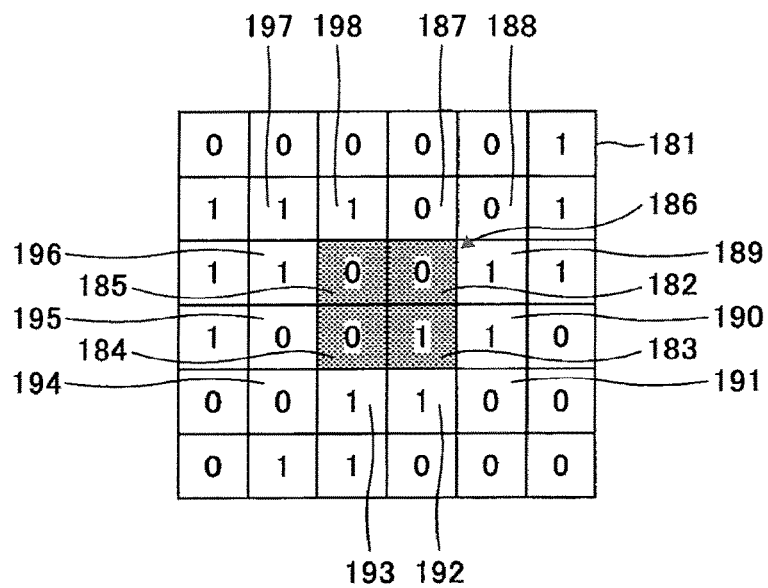
FIG. 18 is a diagram illustrating an operation of determining continuity as an embodiment of the present invention.

FIG. 18 is a diagram illustrating an operation of determining continuity in this embodiment. In FIG. 18, gradation values for pixels in the area 181 are digitalized. The area 181 is an area where a value "0" for bit 1 of the watermark information in the image data whose resolution is 300 dpi is embedded.

In this embodiment, after determining the area 181, on the memory, the resolution of the image in the area 181 is once converted back to 300 dpi from 600 dpi. Subsequently, on the image whose resolution is 300 dpi, a gradation value of the pixel at the temporary embedding position is embedded in the value "0" for bit 1 of the watermark information. Subsequently, after the resolution of the image in the area 181 is converted from 300 dpi to 600 dpi again, extracting the edge and digitalizing gradation values in each pixel are performed.

The area 181 in FIG. 18 illustrates the status after the operations described above are performed. That is, the area 181 in FIG. 18 indicates the status after the operations up to step S1706 in FIG. 17 are performed.

In this case, the watermark information embedded as 1 pixel in the image whose resolution is 300 dpi becomes 4 pixels after the resolution is converted into 600 dpi.

As a result, the embedding position of the watermark information in the area 181 in FIG. 18 corresponds to the area 186 including four pixels 182 to 185.

The embedding unit 220A in this embodiment determines whether or not the area 186 is continuous with the surrounding image and modifies the position of the area 186 in accordance with the determination result.

More specifically, regarding the pixels 182 to 185 included in the area 186, in the image adjacent to each pixel, the embedding unit 220A determines whether or not the pixels opposing via pixels each having a digitalized value corresponding to the value of each pixel exist.

If the embedding unit 220A in this embodiment determines that the area 186 is continuous with the pixels opposing via the area 186, the embedding unit 220A determines the area 186 as the embedding position for the watermark information.

The operation of determining continuity of the area 186 is described specifically below. In this embodiment, regarding pixels outside the area 186 and pixels inside the area 186, the continuity determination unit 221 determines whether or not the pixels opposing via the pixel 182 each having a digitalized value corresponding to the value of each pixel exist.

In FIG. 18, outside the area 186, pixels 187 to 190 and 198 are adjacent to the pixel 182. In addition, in the area 186, pixels adjacent to the pixel 182 are pixels 83 to 185.

In addition, among pixels adjacent to the pixel 182, pixels 187, 188, 184, and 185 are pixels whose digitalized gradation values each correspond to value "0" that the gradation value of the pixel 182 is digitalized. Among those pixels, the pixel 188 is located outside the area 186, and the pixel 184 is located inside the area 186. Consequently, the pixel 182 is considered to be continuous with the image outside the area 186 and the image inside the area 186.

Next, in the embedding unit 220A, the continuity determination unit 221 performs the similar operation as described above on the pixel 183.

Here, outside the area 186, pixels 189 to 193 are adjacent to the pixel 183. In addition, in the area 186, pixels adjacent to the pixel 183 are pixels 182, 184, and 185.

In addition, among pixels adjacent to the pixel 183, pixels 189, 190, 192, and 193 are pixels whose digitalized gradation values each correspond to value "1" that the gradation value of the pixel 183 is digitalized. These four pixels are all located outside the area 186, and there is no pixel adjacent to the pixel 183 whose digitalized gradation value corresponds within the area 186. Consequently, it is considered that the pixel 183 is not continuous with the image inside the area 186.

Next, in the embedding unit 220A, the continuity determination unit 221 performs the similar operation as described above on the pixel 184.

Here, outside the area 186, pixels 192 to 196 are adjacent to the pixel 184. In addition, inside the area 186, pixels adjacent to the pixel 184 are pixels 182, 183, and 185.

In addition, among pixels adjacent to the pixel 184, pixels 194, 195, 182, and 185 are pixels each having a digitalized gradation value corresponding to value "0" that the gradation value of the pixel 184 is digitalized. Among those pixels, the pixels 194 and 195 are located outside the area 186, and the pixels 182 and 185 are located inside the area

186. Consequently, the pixel 184 is considered to be continuous with the image outside the area 186 and the image inside the area 186.

At this point, the continuity determination unit 221 determines that the pixels 182 and 184 in the area 186 are continuous with the pixels 188 and 194 opposing via the area 186. As a result, the embedding unit 220A determines the area 186 as the embedding position for the watermark information.

It should be noted that, in the case illustrated in FIG. 18, regarding the pixels in the area 186, the operation of determining continuity is performed clockwise from the pixel 182. However, the order of performing the operation of determining continuity is not limited specifically.

For example, after performing the operation of determining continuity for all pixels in the area 186 described above, if the continuity determination unit 220A determines that the area 186 is not continuous with the image outside (surrounding) the area 186, the embedding unit 220A in this embodiment modifies the position where the watermark information is embedded.

Figure 19:
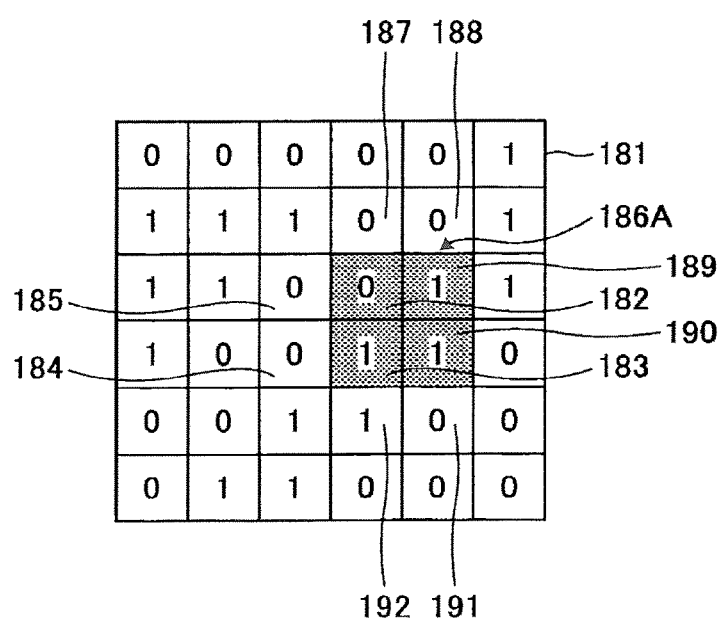
FIG. 19 is a diagram illustrating an operation of modifying a position to be embedded as an embodiment of the present invention.

FIG. 19 is a diagram illustrating an operation of modifying a position to be embedded in this embodiment. In FIG. 19, a case that the position where the watermark information is embedded is modified by "shifting". In FIG. 19, an area 186A that the area 186 is shifted to the left for 1 bit is determined as the position where the watermark information is embedded.

In this case, the embedding unit 220A also performs the similar operation illustrated in FIG. 18 on four pixels 182, 189, 190, and 183 in the area 186A and determines whether or not the image in the area 186A is continuous with the image outside (surrounding) the area 186A.

Figure 20:
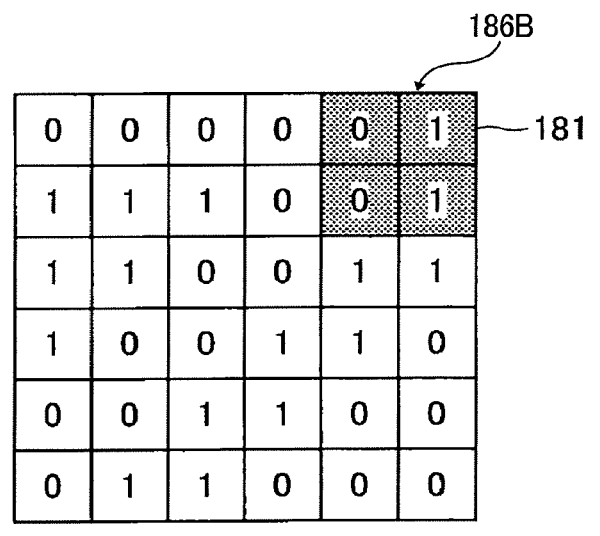

FIG. 20 is a diagram illustrating an operation of modifying a position to be embedded in this embodiment. In FIG. 20, a case that the position where the watermark information is embedded is modified by being moved to "edge" of the image. In FIG. 20, an area 186A that the area 186 is shifted to the left for 1 bit is determined as the position where the watermark information is embedded.

As described above, in this embodiment, even if the resolution of the input image data is different from the resolution of the plotter device 300, the size of the small point where the watermark information is embedded may be modified in accordance with the resolution of the plotter device 300. In addition, in this embodiment, by determining the position where the continuity of the image is not blocked as the position of the small point where the watermark information is embedded, the negative influence of embedding the watermark information on the image may be reduced.

In the embodiment described above, the information processing apparatus that embeds the watermark information in the image data is provided, while reducing a negative influence on the image in visual perception.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
    circuitry configured to:
        receive inputted image data;
        retrieve digital watermark information, to be embedded in the image data, and predetermined coordinate values for embedding each value of the watermark information into the image data;
        determine, for each of the predetermined coordinate values, whether or not an image described based on the image data is continuous or non-continuous with a watermark information area where a respective value of the watermark information is to be embedded, based on the predetermined coordinate values, to generate a determination result;
        change, in accordance with the determination result, the area where the respective value of the watermark information is to be embedded when the determination result indicates that the image data is not continuous with the watermark information area;
        embed each respective value of the watermark information in the image data based on the determination result for each respective value; and
        output the image data with the embedded watermark information,
    wherein the image data is continuous with the watermark information area when, among pixel values which directly surround the watermark information area, there are pixel values opposing each other via a pixel in the watermark information area which have a same digitalized gradation value as the pixel in the watermark information,
    the image data is non-continuous with the watermark information area when, among pixel values which directly surround the watermark information area, there are no pixel values opposing each other via the pixel in the watermark information area which have a same digitalized gradation value as the pixel in the watermark information.

2. The information processing apparatus according to claim 1,
wherein the circuitry shifts, when the determination result indicates that the image based on the image data is not continuous with the watermark information area, the watermark information area from a first position to a second position, the second position being an area continuous with the image based on the image data.

3. The information processing apparatus according to claim 2,
wherein the circuitry moves, when the determination result indicates that the image based on the image data is not continuous with the watermark information area, the watermark information area from the first position to an edge of the image.

4. The information processing apparatus according to claim 1, further comprising a memory to store a setting that sets a method of modifying the area where the watermark information is to be embedded,
wherein the circuitry:
shifts the watermark information area if the memory stores a setting of shifting the watermark information area; and
moves the watermark information area to the edge if the memory stores a setting of moving the watermark information area to the edge.

5. The information processing apparatus according to claim 1,
wherein the circuitry further:
determines whether or not a first resolution of the image data matches a second resolution of a plotter apparatus that outputs the image data into which the watermark information is embedded;
converts, when the first resolution of the image data does not match the second resolution of the plotter apparatus, the image data from the first resolution to the second resolution; and
determines, when the watermark information is to be embedded in the image data whose resolution is converted into the second resolution, whether or not the watermark information area is continuous with the image based on the image data.

6. A system, comprising:
the information processing apparatus of claim 5; and
the plotter apparatus to output an image based on the image data into which the watermark information is embedded.

7. A method of processing information performed by circuitry of an information processing apparatus, the method comprising:
receiving inputted image data;
retrieving digital watermark information, to be embedded in the image data, and predetermined coordinate values for embedding each value of the watermark information into the image data;
determining, for each of the predetermined coordinate values, whether or not an image described based on the image data is continuous or non-continuous with a watermark information area where a respective value of the watermark information is to be embedded, based on the predetermined coordinate values, to generate a determination result;
changing, in accordance with the determination result, the area where the respective value of the watermark information is to be embedded when the determination result indicates that the image data is not continuous with the watermark information area;
embedding each respective value of the watermark information in the image data based on the determination result for each respective value; and
outputting the image data with the embedded watermark information,
wherein the image data is continuous with the watermark information area when, among pixel values which directly surround the watermark information area, there are pixel values opposing each other via a pixel in the watermark information area which have a same digitalized gradation value as the pixel in the watermark information,
the image data is non-continuous with the watermark information area when, among pixel values which directly surround the watermark information area, there are no pixel values opposing each other via the pixel in the watermark information area which have a same digitalized gradation value as the pixel in the watermark information.

8. A non-transitory, computer-readable recording medium storing a program that, when executed by one or more processors of an information processing apparatus, causes the processors to implement a method of processing information, comprising:
receiving inputted image data;
retrieving digital watermark information, to be embedded in the image data, and predetermined coordinate values for embedding each value of the watermark information into the image data;
determining, for each of the predetermined coordinate values, whether or not an image described based on the image data is continuous or non-continuous with a watermark information area where a respective value of the watermark information is to be embedded, based on the predetermined coordinate values, to generate a determination result;
changing, in accordance with the determination result, the area where the respective value of the watermark information is to be embedded when the determination result indicates that the image data is not continuous with the watermark information area;
embedding each respective value of the watermark information in the image data based on the determination result for each respective value; and
outputting the image data with the embedded watermark information,
wherein the image data is continuous with the watermark information area when, among pixel values which directly surround the watermark information area, there are pixel values opposing each other via a pixel in the watermark information area which have a same digitalized gradation value as the pixel in the watermark information,
the image data is non-continuous with the watermark information area when, among pixel values which directly surround the watermark information area, there are no pixel values opposing each other via the pixel in the watermark information area which have a same digitalized gradation value as the pixel in the watermark information.

* * * * *